(12) United States Patent
Fischer

(10) Patent No.: US 11,818,143 B1
(45) Date of Patent: Nov. 14, 2023

(54) AUTHENTICATOR APPLICATION FOR WIRELESS COMMUNICATION DEVICES AND NETWORKS

(71) Applicant: T-Mobile USA, Inc., Bellevue, WA (US)

(72) Inventor: Keldon Beckley Fischer, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/463,928

(22) Filed: Sep. 1, 2021

(51) Int. Cl.
*H04L 29/06* (2006.01)
*H04L 9/40* (2022.01)

(52) U.S. Cl.
CPC .................. *H04L 63/126* (2013.01)

(58) Field of Classification Search
CPC ....... H04L 63/126; H04L 29/06; H04L 63/14; H04L 63/1416; H04L 63/1475; H04L 63/0823; H04L 9/006; H04L 9/0844; H04L 9/3242
See application file for complete search history.

(56) References Cited

U.S. PATENT DOCUMENTS

| | | | | |
|---|---|---|---|---|
| 2002/0147926 A1* | 10/2002 | Pecen | ................. | H04L 63/0853 726/7 |
| 2006/0206709 A1* | 9/2006 | Labrou | .................. | G06Q 20/18 713/167 |
| 2008/0282331 A1* | 11/2008 | Teo | ......................... | H04L 63/08 726/5 |
| 2018/0176221 A1* | 6/2018 | Zhou | ....................... | H04W 4/21 |
| 2018/0219681 A1* | 8/2018 | Geiman | ................ | H04L 9/3231 |
| 2019/0052467 A1* | 2/2019 | Bettger | ................... | H04L 9/088 |

* cited by examiner

*Primary Examiner* — Quazi Farooqui
(74) *Attorney, Agent, or Firm* — Lee & Hayes, P.C.

(57) ABSTRACT

Systems and methods discussed herein are directed to a method within a wireless communication network that includes, based at least in part on sending a login associated with a phone number, receiving a code at an electronic device associated with the phone number. A hash code corresponding to the code at an app executing on the electronic device associated with the phone number is received and an input is received. Based at least in part on the input, the input is hashed to provide a hashed code. The hashed code is compared with the hash code and it is determined if the hashed code matches the hash code. Based at least in part on determining the hashed code matches the hash code, the hash code is forwarded to a location associated with the login. The location may comprise one of a website or an app.

12 Claims, 5 Drawing Sheets

AUTHENTICATOR APPLICATION FOR WIRELESS COMMUNICATION DEVICES AND NETWORKS

BACKGROUND

Currently, when users attempt to access a website or an app (application) using their wireless communication device, e.g., a mobile phone, the website or app may use a two-factor identification process for authentication of the user. This two-factor identification process may utilize a phone number associated with the wireless communication device. The website or app may send a passcode to the phone number and then the user may enter the passcode into an appropriate user interface (UI) of the website or app. The passcode is then verified by the website or app, which allows the user to access the website or app if the passcode matches. Thus, in order to access the website or app, two factors are needed from the user: the user's password for the website or app plus the passcode provided by the website or app.

Unfortunately, this may not be as secure of a practice as people may believe. Generally, the process is fairly hackable by malicious entities for accessing websites or apps. Additionally, such a two-factor identification process may be utilized for mobile users to change their subscriber identity module (SIM), which also allows for malicious entities to hack and steal SIMs. Also, other types of hacks may be used that include a malicious app provided by a malicious entity that creates a UI that looks identical to the UI for the two-factor identification screen and thereby can steal the user's password and/or the passcode provided by the website or app.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
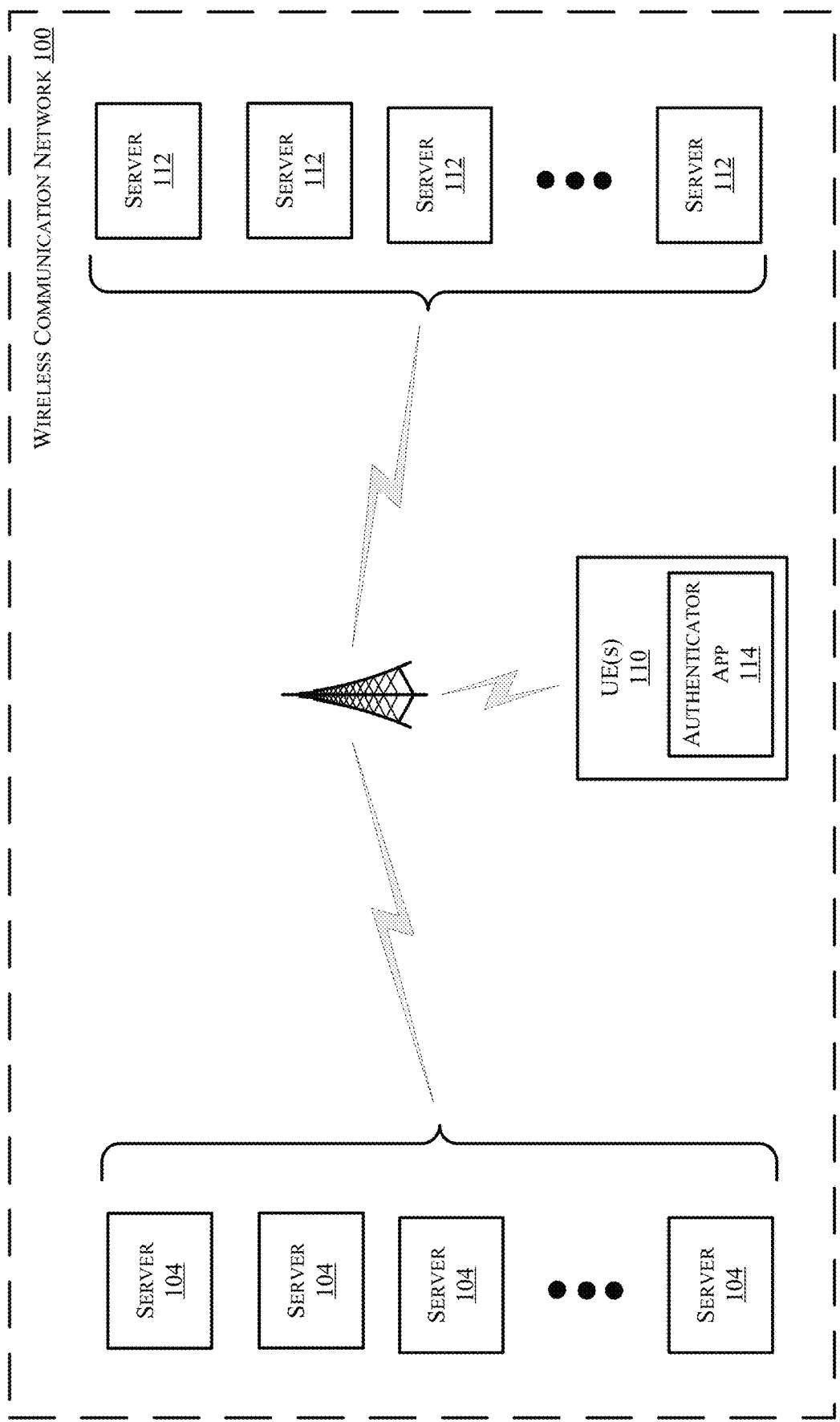
FIG. 1 schematically illustrates a portion of an example wireless communication network and a platform for implementing an authenticator application (app) that may execute on a user's portable electronic communication device, in accordance with various configurations.

Techniques and architecture are described herein for implementing an authenticator application (app) that may execute on a user's portable electronic communication device. The authenticator app may work in conjunction with a two-factor identification process.

In configurations, when a user attempts to access a website or app (referred to herein collectively as website) over a wireless communication network using a wireless communication device, the website may provide a two-factor login to the user. The user may enter a login password. However, in configurations, the two-factor identification may not require a separate login password. The user may also enter a phone number associated with the wireless communication device, with or without the login password.

The website may notify an operator of the wireless communication network over which the wireless communication device is operating that the user is trying to login with the phone number. The phone number is generally associated with the wireless communication network and an account of the user.

The operator of the wireless communication network may utilize the phone number to identify the user. The operator of the wireless communication network may then forward a code to the user's wireless communication device within the authenticator app for input into the authenticator app. The operator of the wireless communication network may also inform the website that the user has the authenticator app enabled on their wireless communication device. The website may then forward the verification code to the user. The user may then see the verification code appear in the website's app and that it has been copied. The user receives the verification code from the website and puts it into the authenticator app. The authenticator app sends the code to the website provided using a path provided by the website, e.g., the path used by the website to alert the operator of the wireless communication network that a user is trying to login with the phone number. The website may determine that the code matches the code received by the authenticator app and thus grants access to the user via the user's portable electronic communication device to the website.

In configurations, the authenticator app may also verify that the wireless communication device is indeed the wireless communication device that originally attempted to login to the website.

In configurations, if the user does not have the authenticator app on the portable electronic communication device, then the traditional method of forwarding a verification code via, e.g., a text (SMS), to the portable communication device may be utilized. The user may then input the verification code received via text message in the appropriate user interface box provided by the website.

Thus, the techniques and architecture described herein provide a method within a wireless communication network, the method that comprises, based at least in part on sending a login associated with a phone number, receiving a code at an electronic device associated with the phone number. The method also comprises receiving a hash code corresponding to the code at an app executing on the electronic device associated with the phone number. The method further comprises receiving an input. The method also comprises, based at least in part on the input, hashing the input to provide a hashed code. The method further comprises, comparing the hashed code with the hash code. The method also comprises, based at least in part on comparing the hashed code with the hash code, determining if the hashed code matches the hash code.

FIG. 1 schematically illustrates a wireless communication network 100 that includes various components. The wireless communication network 100 includes a base station 102.

The wireless communication network 100 further includes multiple servers 104 that provide services to UEs 110 within the wireless communication network 100. The wireless communication network 100 provides access to websites hosted by various servers 112, e.g., the wireless communication network 100 provides UEs 110 access to the Internet. The servers 112 may be located within a coverage area of the wireless communication network 100 or may be located external to the coverage area of the wireless communication network 100. In configurations, one or more UEs may include an authenticator app 114 executing thereon for authenticating the UEs 110 and/or their users when accessing websites and/or other apps. As is known, the wireless communication network 100 generally includes multiple base stations 102 and multiple access points (not illustrated). Also, as is known, there are generally many more components within the wireless communication network 100 (generally implemented by the servers 104) that are not illustrated in FIG. 1 for clarity purposes. Examples of such components include, but are not limited to, Home Location Register/Home Subscriber Server (HLR/HSS), Charging System (CS), Policy Enforcement Server (NAP), Short Message Service Server (SMS), Voice Mail Server (VMS), EPOCH, GFLEX, IP Management System (IPM), Caller Tunes (CTUNES), XDMS, MSTORE, Web Services Gateway (WSG), Over the Air (OTA) System, etc.

The UEs 110 are configured to operate within the wireless communication network 100 according to one or more operating protocols. In configurations, the wireless communication network 100 and the UEs 110 may be configured to operate according to one or more operating protocols including, but not limited to, Global System for Mobile Communications (GSM), Time Division Multiple Access (TDMA), Universal Mobile Telecommunications System (UMTS), Evolution-Data Optimized (EVDO), 3G, 4G, 5G, Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology, and/or the like.

The UEs 110 may be implemented as a mobile computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, a motor vehicle, and/or similar mobile devices. In configurations, the UEs 110 may be implemented as an Internet of things (IoT) device (also known as a machine-to-machine (M2M) device) configured to operate within the wireless communication network 100. Although this description predominantly describes the UE 110 as being "mobile" (i.e., configured to be carried and moved around), it is to be appreciated that the UEs 110 may represent various types of communication devices that are generally stationary as well, such as televisions, appliances, desktop computers, game consoles, set top boxes, and the like. In this sense, the terms "communication device," "wireless device," "wireless communication device," "wireline device," "mobile device," "mobile communication device," "computing device," "mobile computing device," and "user equipment (UE)" may be used interchangeably herein to describe any communication device capable of performing the techniques described herein. Furthermore, the UEs 110 may be capable of communicating over wired networks, and/or wirelessly using any suitable wireless communications/data technology, protocol, or standard, such as those mentioned above. As is known, there are generally numerous UEs 110 operating within the wireless communication network 100.

Figure 2:
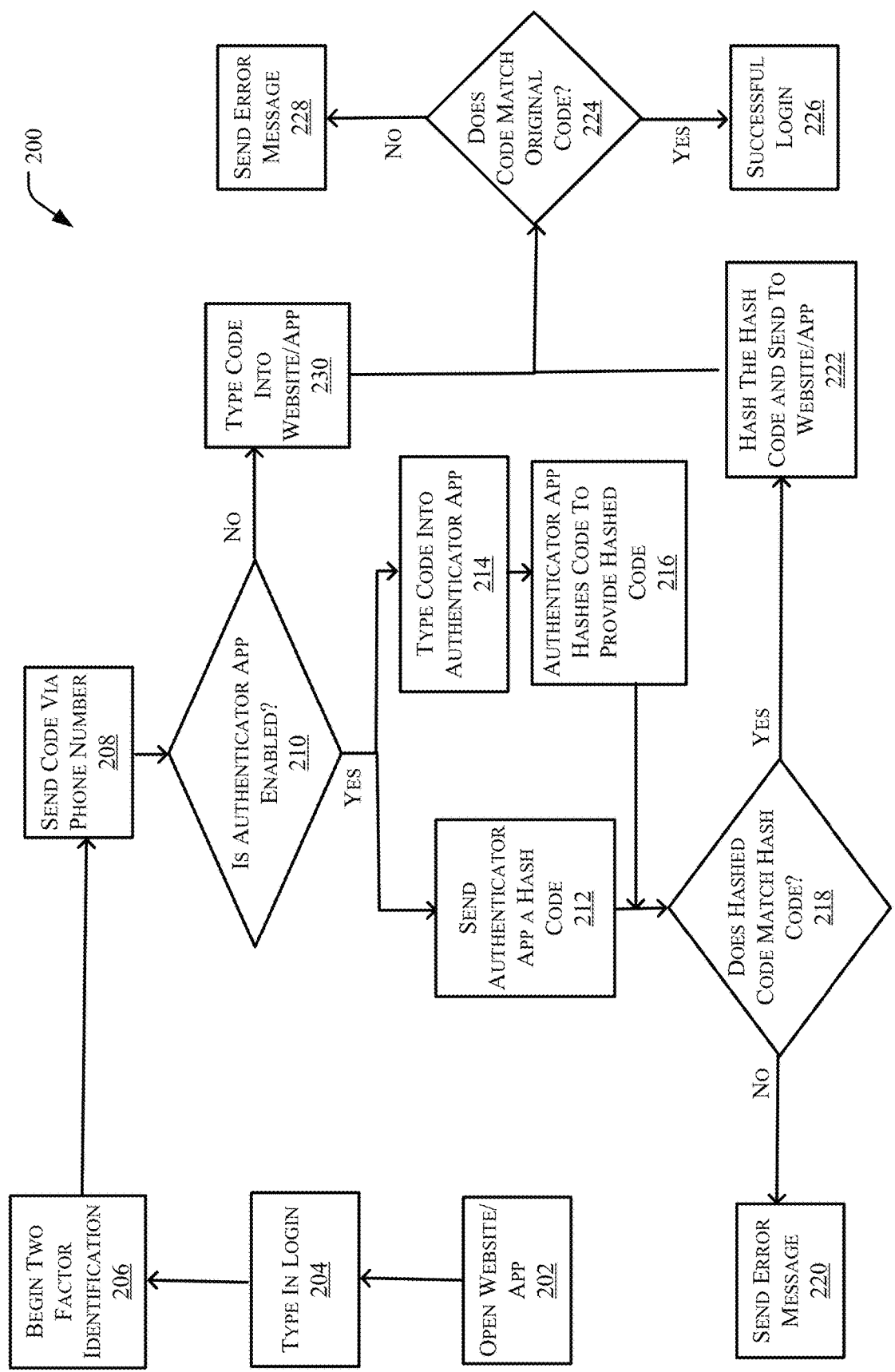
FIG. 2 is a flow diagram of an example process for implementing an authenticator application (app) that may execute on a user's electronic communication device in the wireless communication network of FIG. 1, in accordance with various configurations.

FIG. 2 is a flow diagram of an illustrative process that may be implemented within or in association with the wireless communication network 100. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices.

FIG. 2 is a flow diagram of an example process 200 for implementing an authenticator application (app), e.g., authenticator app 114, that may execute on a user's electronic communication device, e.g., a user's UE 110. In configurations, the authenticator app 114 may work in conjunction with a two-factor identification process.

At 202, in configurations, the user opens a website or app (application) (collectively referred to herein as website) for access. The user may use a UE 110 that accesses the website via the wireless communication network 100. Thus, the user has a phone number associated with the wireless communication network 100. The website may provide a user interface that includes a login. At 204, the login may ask for a user name or phone number and a password. In configurations, the login may simply be the phone number or a user name. The user name would thus be associated with the phone number.

In configurations, at 206, the website may then begin a two-factor identification process. In such a process, at 208, the website may forward a code via the phone number to the UE 110. At 210, it may then be determined whether the user includes the authenticator app 114 enabled on the UE 110. In configurations, the authenticator app 114 may be provided by an operator of the wireless communication network 100.

At 212, if the user has the authenticator app 114 enabled on their UE 110, then the operator of the wireless communication network 100 may forward a hash code and the phone number/ID with which the hash code is associated to the authenticator app 114. Additionally, at 214, if the authenticator app 114 is enabled, the code provided by the website at 208 may be typed into the authenticator app 114 by the user. At 216, the authenticator app 114 may then hash the code to obtain a hashed code.

At 218, the authenticator app 114 may then verify that the hash code from the authenticator app 114 matches the hashed code provided by the user by comparing the hash code and the hashed code. Additionally, in configurations, the authenticator app 114 may determine if the hashed code was provided by the correct portable electronic communication device, e.g., the correct portable electronic device associated with the phone number/user ID.

At 220, If the hashed code and the hash code from the authenticator app 114 do not match, then an error message may be provided to the user via the UE 110, indicating that the hash code and the hashed code do not match Access to the website may be denied. At 222, if the hash code and the hashed code do match, then the hash code may be hashed and sent back to the website. At 224, the website may compare the hashed code with the original code that was forwarded to the UE 110 at 208. If the original code matches the hashed code received from the authenticator app 114, then at 226 the website may indicate to the user that the login was successful and grant access to the website. However, at 228, if the hashed code from the authenticator app 114 does not match the original code, then an error message indicating a failed login attempt may be provided to the user and access to the website may be denied.

Returning to 210, if the user does not have the authenticator app 114 enabled on their UE 110, then at 230 the user may type the code from the website into a user interface provided by the website. At 224, the website may then verify that the code entered into the user interface matches the original code. If entered code does not match the original code, then at 228, an error message may be forwarded to the user indicating a failed login attempt and access to the website may be denied. If at 224 the entered code does match the original code, then at 226 a successful login message may be provided and access to the website may be granted to the user.

Figure 3:
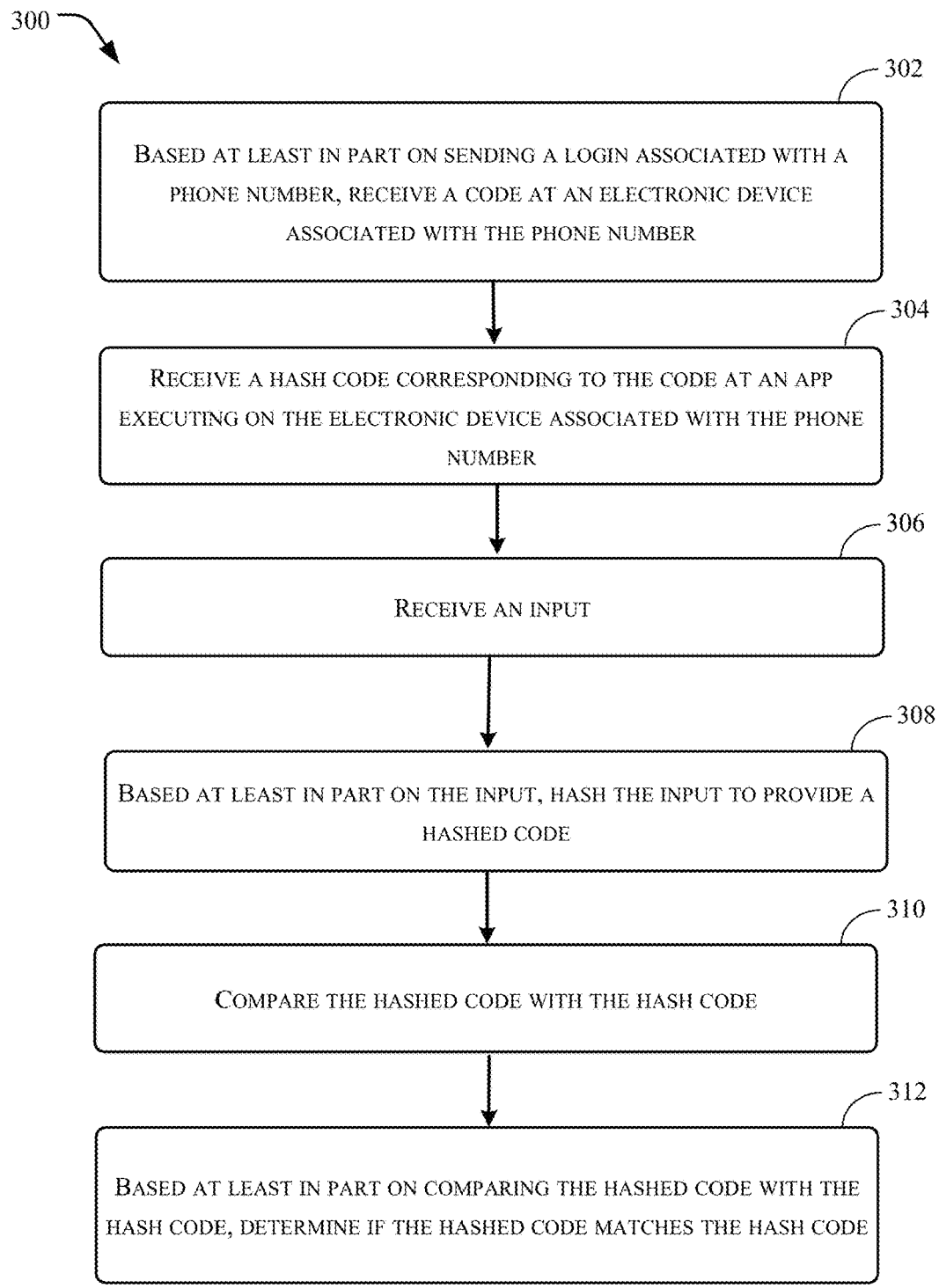
FIG. 3 is a flow diagram of another example process for implementing an authenticator application (app) that may execute on a user's electronic communication device in the wireless communication network of FIG. 1, in accordance with various configurations.

FIG. 3 is another flow diagram of an illustrative process that may be implemented within or in association with the wireless communication network 100. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices.

FIG. 3 is a flow diagram of an example process 300 within a wireless communication network for implementing an authenticator application (app), e.g., authenticator app 114, that may execute on a user's electronic communication device, e.g., a user's UE 110. At block 302, based at least in part on sending a login associated with a phone number, receiving a code at an electronic device associated with the phone number. At block 304, a hash code corresponding to the code at an app executing on the electronic device associated with the phone number is received.

At block 306, an input is received. At block 308, based at least in part on the input, the input is hashed to provide a hashed code. At block 310, the hashed code is compared with the hash code. At block 312, based at least in part on comparing the hashed code with the hash code, it is determined if the hashed code matches the hash code.

While the techniques and architecture described herein have been primarily described with respect to a wireless communication network, those skilled in the art will recognize that the techniques and architecture are equally applicable to other types of networks that utilize application pods and containers to provide services to various devices.

Figure 4:
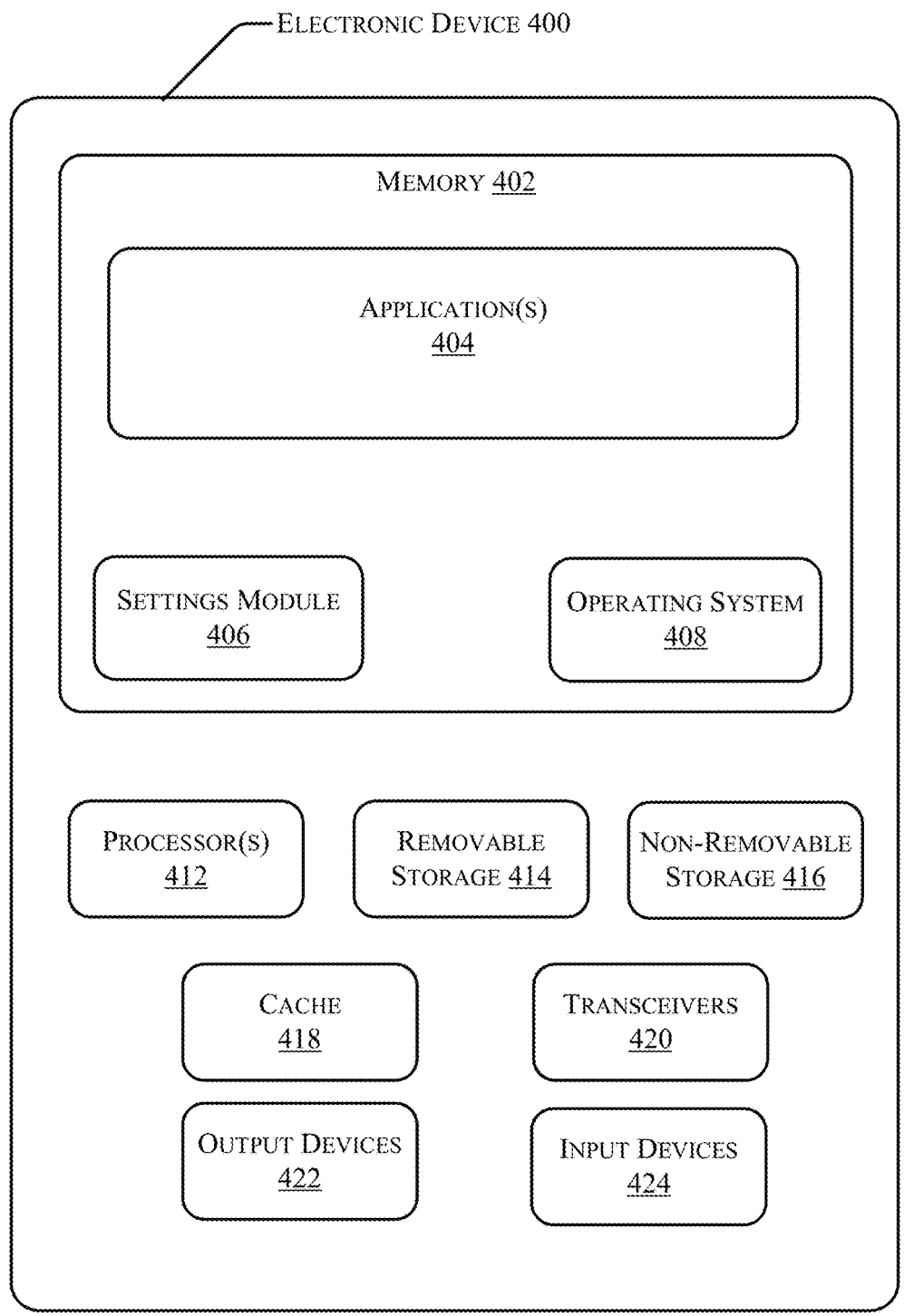
FIG. 4 schematically illustrates a component level view of an example electronic device configured for use in the wireless communication network of FIG. 1, in accordance with various configurations.

FIG. 4 schematically illustrates a component level view of an example electronic device 400, such as UE 110, configured to function within wireless communication network 100. The electronic device 400 may include more or less components depending on the type of electronic device. As illustrated, the electronic device 400 comprises a system memory 402, e.g., computer-readable media, storing application(s) 404. For example, the system memory 402 may include one or more application(s) (app(s)) 404 configured to implement one or more functions with respect to authentication described herein, e.g., the authenticator app 114, as described herein. The mobile device also comprises a settings module 406, and an operating system 408. Also, the electronic device 400 includes processor(s) 412, a removable storage 414, a non-removable storage 416, cache 418, transceivers 420, output device(s) 422, and input device(s) 424. In various implementations, system memory 402 is volatile (such as RAM), non-volatile (such as ROM, flash memory, etc.) or some combination of the two. In some implementations, the processor(s) 412 is a central processing unit (CPU), a graphics processing unit (GPU), or both CPU and GPU, or any other sort of processing unit.

The electronic device 400 may also include additional data storage devices (removable and/or non-removable) such as, for example, magnetic disks, optical disks, or tape. Such additional data storage may include removable storage 414 and non-removable storage 416. Additionally, the electronic device 400 includes cache 418.

Non-transitory computer-readable media may include volatile and nonvolatile, removable and non-removable tangible, physical media implemented in technology for storage of information, such as computer readable instructions, data structures, program modules, or other data. System memory 402, removable storage 414, non-removable storage 416 and cache 418 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the electronic device 400. Any such non-transitory computer-readable media may be part of the electronic device 400. The processor(s) 412 may be configured to execute instructions, which may be stored in the non-transitory computer-readable media or in other computer-readable media accessible to the processor(s) 412.

In some implementations, the transceivers 420 include any sort of transceivers known in the art. For example, the transceivers 420 may include a radio transceiver that performs the function of transmitting and receiving radio frequency communications via an antenna (not shown). Also, or alternatively, the transceivers 420 may include wireless modem(s) to facilitate wireless connectivity with other computing devices. Further, the transceivers 420 may include wired communication components, such as an Ethernet port, for communicating with other networked devices.

In some implementations, the output devices 422 include any sort of output devices known in the art, such as a display (e.g., a liquid crystal display), speakers, a vibrating mechanism, or a tactile feedback mechanism. Output devices 422 also include ports for one or more peripheral devices, such as headphones, peripheral speakers, or a peripheral display.

In various implementations, input devices 424 include any sort of input devices known in the art. For example, input devices 424 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 424 may be used to enter preferences of a user of the electronic device 400 to define how the user wishes certain calls from third parties to be handled by the wireless communication network, as previously described herein.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 402 is an example of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may various perform operations. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
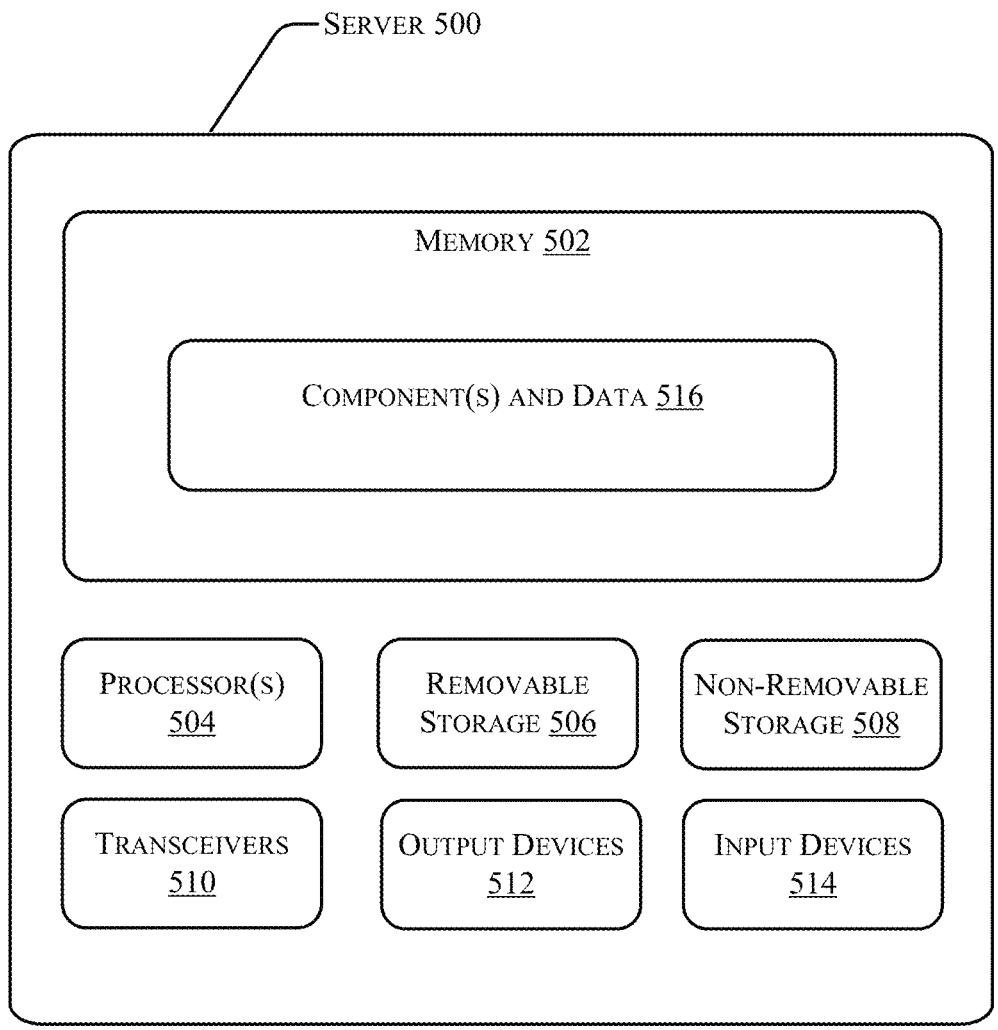
FIG. 5 schematically illustrates a component level view of a server configured for use in the wireless communication network of FIG. 1, in accordance with various configurations.

FIG. 5 illustrates a component level view of a server 500 configured for use within a wireless communication network, e.g., wireless communication network 100, in order to provide various services within the wireless communication network, according to the techniques described herein. For example, one or more servers 500 may be configured to implement one or more servers 104 and/or servers 112.

As illustrated, the server 500 comprises a system memory 502 that may store one or more components, modules, and/or applications and data 516 for interacting with electronic devices 400, e.g., UEs 110, or other electronic devices that may be configured as connected devices, as described herein. Also, the server 500 may include processor(s) 504, a removable storage 506, a non-removable storage 508, transceivers 510, output device(s) 512, and input device(s) 514.

In various implementations, system memory 502 is volatile (such as RAM), non-volatile (such as ROM, flash memory, etc.), or some combination of the two. In some implementations, the processor(s) 504 is a Central Processing Unit (CPU), a Graphics Processing Unit (GPU), or both CPU and GPU, or any other sort of processing unit.

The server 500 may also include additional data storage devices (removable and/or non-removable) such as, for example, magnetic disks, optical disks, or tape. Such additional storage is illustrated in FIG. 5 by removable storage 506 and non-removable storage 508. The one or more of the memory 502, the removable storage 506 and/or the non-removable storage 508 may include module(s) and data 516 (illustrated in the memory 502). The module(s) and data 516 may include instructions executable by, for example, the processor(s) 504.

Non-transitory computer-readable media may include volatile and nonvolatile, removable and non-removable tangible, physical media implemented in technology for storage of information, such as computer readable instructions, data structures, program modules, or other data. System memory 502, removable storage 506 and non-removable storage 508 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 500. Any such non-transitory computer-readable media may be part of the server 500.

In some implementations, the transceivers 510 include any sort of transceivers known in the art. For example, the transceivers 510 may include wired communication components, such as an Ethernet port, for communicating with other networked devices. Also, or instead of, the transceivers 510 may include wireless modem(s) to facilitate wireless connectivity with other computing devices. Further, the transceivers 510 may include a radio transceiver that performs the function of transmitting and receiving radio frequency communications via an antenna.

In some implementations, the output devices 512 include any sort of output devices known in the art, such as a display (e.g., a liquid crystal display), speakers, a vibrating mechanism, or a tactile feedback mechanism. Output devices 512 also include ports for one or more peripheral devices, such as headphones, peripheral speakers, or a peripheral display.

In various implementations, input devices 514 include any sort of input devices known in the art. For example, input devices 514 may include a camera, a microphone, a keyboard/keypad, a computer mouse, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 502 and memory 502 are examples of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1-3. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method within a wireless communication network, the method comprising:
   based at least in part on sending a login associated with a phone number, receiving a code at an electronic device associated with the phone number;
   after the login, determining that there is an authenticator app executing on the electronic device associated with the phone number, the authenticator app being separate and distinct from a website or app through which the login was received;
   in response to the determining, receiving a hash code corresponding to the code at the authenticator app;
   receiving an input in response to a request for the code;
   based at least in part on the input, hashing the input to provide a hashed code;
   comparing the hashed code with the hash code;
   based at least in part on comparing the hashed code with the hash code, determining if the hashed code matches the hash code; and
   based at least in part on determining the hashed code matches the hash code, forwarding the hash code to a location associated with the login,
   wherein a device at the location associated with the login determines that the hash code matches the code received at the electronic device and, in response, indicates a successful login to the electronic device.

2. The method of claim 1, wherein the location comprises one of a (i) website or (ii) an app.

3. The method of claim 1, further comprising:
   prior to forwarding the hash code to the location, hashing the hash code.

4. The method of claim 1, further comprising:
   verifying the hashed code was received from the electronic device.

5. An apparatus comprising:
   one or more processors; and
   a non-transitory storage medium comprising instructions stored thereon, the instructions being executable by the one or more processors to cause the processors to perform one or more actions comprising:
      based at least in part on sending a login associated with a phone number, receiving a code;
      after the login, determining that there is an authenticator app executing on the apparatus, the authenticator app being separate and distinct from a website or app through which the login was received;

in response to the determining, receiving a hash code corresponding to the code at the authenticator app;

receiving an input in response to a request for the code;

based at least in part on the input, hashing the input to provide a hashed code;

comparing the hashed code with the hash code;

based at least in part on comparing the hashed code with the hash code, determining if the hashed code matches the hash code; and based at least in part on determining the hashed code matches the hash code, forwarding the hash code to a location associated with the login, wherein a device at the location associated with the login determines that the hash code matches the code received at the electronic device and, in response, indicates a successful login to the electronic device.

6. The apparatus of claim 5, wherein the location comprises one of a (i) website or (ii) an app.

7. The apparatus of claim 5, wherein the actions further comprise:

prior to forwarding the hash code to the location, hashing the hash code.

8. The apparatus of claim 5, wherein the actions further comprise:

verifying the hashed code was received from the apparatus.

9. A non-transitory storage medium comprising instructions stored thereon, the instructions being executable by one or more processors to perform actions comprising:

based at least in part on sending a login associated with a phone number, receiving a code at an electronic device associated with the phone number;

after the login, determining that there is an authenticator app executing on the electronic device associated with the phone number, the authenticator app being separate and distinct from a website or app through which the login was received;

in response to the determining, receiving a hash code corresponding to the code at the authenticator app;

receiving an input in response to a request for the code;

based at least in part on the input, hashing the input to provide a hashed code;

comparing the hashed code with the hash code;

based at least in part on comparing the hashed code with the hash code, determining if the hashed code matches the hash code; and based at least in part on determining the hashed code matches the hash code, forwarding the hash code to a location associated with the login, wherein a device at the location associated with the login determines that the hash code matches the code received at the electronic device and, in response, indicates a successful login to the electronic device.

10. The non-transitory storage medium of claim 9, wherein the location comprises one of a (i) website or (ii) an app.

11. The non-transitory storage medium of claim 9, wherein the actions further comprise:

prior to forwarding the hash code to the location, hashing the hash code.

12. The non-transitory storage medium of claim 9, wherein the actions further comprise:

verifying the hashed code was received from an apparatus that includes the non-transitory storage medium.

\* \* \* \* \*